May 14, 1963

I. VICTOR 3,089,250

METHOD OF RECOVERING A VOLATILE ORGANIC SOLVENT
FROM AN ABSORBENT WITH STEAM
Filed Aug. 17, 1959

INVENTOR.
IRVING VICTOR
BY
Whiteley & Caine
ATTORNEYS

United States Patent Office 3,089,250
Patented May 14, 1963

3,089,250
METHOD OF RECOVERING A VOLATILE ORGANIC SOLVENT FROM AN ABSORBENT WITH STEAM
Irving Victor, Minneapolis, Minn., assignor to Research Development Co., Minneapolis, Minn., a partnership
Filed Aug. 17, 1959, Ser. No. 834,236
3 Claims. (Cl. 34—37)

This invention relates to improvements in method for the recovery of a volatile substance, such as an organic solvent, by the steam distillation thereof from other non-volatile materials. More particularly, the invention is concerned with increasing the efficiency of recovery of an organic liquid from solid materials by improving the quality of steam used in the distillation process, and by revolatilizing condensate within the distillation apparatus, and thus prevent the collection of water in the solids.

This application is a continuation-in-part of my prior application Ser. No. 644,155, filed March 5, 1957.

There are many industrial processes which use organic liquids in the processing or treating of materials, and wherein said liquids are subsequently recovered. Specific examples of such processes are the cleaning or cleansing of materials, such as garments or fabrics, and/or the degreasing of metal parts. In these processes, organic solvents such as halogenated hydrocarbons are used, and which because of their cost, or for other reasons, must be recovered.

In conducting such processes, a substantial portion of the organic liquid becomes entrained with other materials from which it can best be removed by steam distillation. For example, in the cleaning of garments or fabrics, soil is transferred from the fabric by washing action, and such soil is subsequently removed from the solvent by adding thereto a filtering agent, such as diatomaceous earth, and the mixture is subsequently filtered, leaving a residue of soil and earth, commonly referred to as "muck." Such muck retains a substantial amount of liquid solvent. A process of recovering liquid solvent from muck by distillation is disclosed in my prior Patent No. 2,893,925, issued July 7, 1959.

Referring again to the material treating process, a portion of the solvent exists in a vapor form in or about the cleaning apparatus, and this portion of the solvent is recoverable by a solid adsorbent, such as activated carbon, from which the solvent is recoverable by steam distillation. A process of this nature is disclosed in my co-pending application Ser. No. 724,145 now Patent 2,910,137.

In either process, the solvent ladened material is disposed on a perforate surface within a container that is, or may be suitably joined at an outlet to a condenser, and is provided with means of admitting steam into the material. Because the container and the material therein are generally at a temperature not substantially in excess of ambient, during the adsorption cycle, when steam for distillation is initially admitted to the material, much of it is transformed into condensate, which serves no useful purpose, and is actually undesirable when removing solvent from an adsorbent such as activated carbon, because the condensed water enters the pores of the carbon and must be subsequently removed before the adsorbent is capable of again adsorbing solvent vapors.

In the present invention, a source of dry heat forms a part of the distillation apparatus, and serves as a means of eliminating condensate formed within the distillation unit, resulting from steam contacting cool surfaces or cool material in the distillation chamber. The source of heat is disclosed herein in one modification as a steam chest provided with means for eliminating condensate from the boiler steam, or from steam which condenses in the chest, and thus assures that the process steam is free of water in the liquid phase. In another modification, the source of heat may be in the form of a heater, such as a steam expansion chamber, or an electrically heated member, which in either instance is capable of forming steam from water or condensate in the base of the distillation chamber.

An object of the invention is to provide an improved method of steam stripping a volatile organic solvent from a solid adsorbent within a container by the use of a heated surface disposed within the container and beneath a perforate surface on which the adsorbent is supported so as to revolatilize any condensate formed by the steaming operation and also maintaining the area within the container beneath the perforate surface in a liquid-free condition.

Another object is to provide a method of separating a volatile substance from a non-volatile substance by supporting the mixture on a perforate surface within a distillation container, passing steam through the material to liberate the volatile substance, and re-evaporating any condensate that forms within the container by bringing such condensate into contact with a heated surface within the container and beneath the perforate surface.

A further object is to provide a method of distilling solvent from a solid substance within a container by, passing boiler steam through a chest located at the base of the container to eliminate condensate from the steam before the latter is brought into contact with the solid substance, and thereafter to utilize a heated surface of said steam chest to improve the quality of steam and revolatilize condensate formed within said container.

Other and further objects of the invention may be apparent from the following specification and claims, and in the appended drawings in which:

FIG. 1 is a side elevation of a vapor adsorbing apparatus incorporating one modification of the present invention, and in which certain parts are broken away to show interior construction;

FIG. 2 is a side elevation of a muck recovery apparatus with which one form of the present invention has been combined, and which also has certain parts broken away to show interior constructions; and, FIG. 3 is a partial view of the base of a container, applicable to the structures of either FIG. 1, or FIG. 2, but illustrating a modification of the invention disclosed herein.

Referring now to the drawings, the invention will be described in detail.

Referring first to FIG. 1, general reference numeral 10 indicates in its entirely a solvent vapor recovery apparatus of the type disclosed in my aforesaid Patent 2,910,137. Reference character 12 indicates an adsorbent container, which is cylindrical in nature and provided with a dish-shaped upper portion 14 that joins a cylindrical neck portion 16. The neck portion is closed on its upper surface by a flanged plate 18. The body portion 12 has a lower dished surface 20 that terminates in a lower cylindrical neck portion 22. A conduit 24 extends from a source of solvent vapors to the neck portion 16, and a second conduit 26 provides egress from the neck portion 22. A damper 28 controls the flow of vapors through the conduit 24, and a damper 30 is provided in conduit 26.

Within the interior of container 12, and located at the junction of the lower dished portion 20, is a foraminous plate 32 that forms a support for a mass of adsorbent material 34, which may be constituted of pellets or granules of activated carbon. In the preferred practice of the invention, solvent ladened vapors are admitted into the interior of the container through conduit 24, passed down through the adsorbent mass 34, and the residual gases are discharged through the lower conduit 26. A suitable blower system, not shown, is provided for forcing the gases through the absorbent mass. Under these circumstances, the dampers 28 and 30 are open.

The lower neck portion 22 is closed by a plate 36, which may preferably be upwardly dished as shown in the drawings. Plate 36 coacts with the lower neck portion 22 and with a second, preferably downwardly dished plate 38, to form a steam chest indicated by the general reference numeral 40. Plate 38 receives a steam inlet conduit 42, which is provided with a control valve 44. A condensate outlet pipe 46 extends from the lower extremity of plate 38, and contains a control valve 48. A steam outlet pipe 50 extends from the steam chest 40 at a point above which condensate would normally be present, and is provided with a suitable valve 52. The conduit 50 enters the lower neck portion 22, and therefore into the area of the container 12 beneath the foraminous plate 32. Although not specifically shown, the lower surface of plate 38, and the several conduits would normally be covered with heat insulating material.

The upper flanged plate 18 has extending therefrom an outlet conduit 54, which contains a control valve 56, and extends to a suitable condenser and solvent separator that are well known in the art. The entire structure is shown as supported on suitable legs 58 and 60.

The operation of the invention in conjunction with the structure shown in FIG. 1 will now be described.

With the dampers 28 and 30 in an open position, solvent vapor ladened gases are passed through the conduit 24 into container 12, whence they pass downwardly through the neck portion 16 and the absorbent material 34, which through a well known adsorbing action removes the solvent vapor and permits the denuded gas, which is generally air, to pass through the foraminous plate 32, the neck portion 22 to the conduit 26. When it is determined that the adsorbent should be regenerated, the dampers 28 and 30 are closed, and valve 56 is opened. Then steam from a suitable boiler, not shown, is admitted to the steam chest 40 through conduit 42 by the opening of valve 44. The pipes leading from the boiler, and conduit 42, will undoubtedly contain condensate, and as steam enters the chest 40 and contacts the surfaces therein, additional condensate will form, and such condensate is removed through pipe 46 under the control of valve 48. Substantially dry steam is permitted to pass from the chest under the control of valve 52 through pipe 50 into the lower neck portion 22 of the container, where it passes upwardly through the foraminous plate 32 and into the adsorbent 34. The prior operation of the unit as an adsorber will have established the temperature of the container and the adsorbent to be substantially ambient temperature, and therefore, considerable condensation will occur within container 12, and the liquid will flow downward to the plate 36, which being subject to the heat of steam in the chest 40, will revolatilize the liquid and thus minimize the amount of liquid within container 12. The steam passing upwardly through the solids liberates the solvent therefrom and passes outwardly to the condenser and separator for cooling and separation in a conventional manner. When the solvent has been liberated from the adsorbent, the valves 44, 52 and 56 are closed, the dampers 28 and 30 opened, and a new cycle may occur.

Referring now to FIG. 2, general reference numeral 60 indicates a muck recovery still composed of a chamber 62, which is closed at its upper extremity by a removable dome-shaped lid 64 that is held in a normally closed position by clamping means 66. The chamber 62 is supported on legs 68. A conduit 70, containing a sight glass 72 and a control valve 74 forms an inlet to chamber 62 for a slurry composed of solvent and muck from a primary filter chamber, not shown. Within the interior of chamber 62, and indicated by dotted lines, are a plurality of filter elements 76, which are disclosed as being in a vertical position in the upper portion of the chamber, or which may be horizontally disposed in the lower portion of the chamber, if desired. The filtering elements 76 each have an exposed filtering surface, such as a cloth bag or a screen, for the collection of solids. The several filtering elements are joined to a manifold 78, which extends to an outlet conduit 80, containing suitable control valves 82, 84, for regulating the flow of the filtered solvent to a proper place of disposal for re-use.

Within the interior of the lower portion of chamber 62 is a perforate plate 86, forming the upper limits of a subchamber 90. Spaced below the perforate plate 86 is a solid plate 92 that forms the upper surface of a steam chest 94. A curved plate 96 is joined at its periphery to plate 92, and constitutes the lower surface of the steam chest 94. A conduit 98 extends from a source of boiler steam to the steam chest 94, and contains a control valve 100. A conduit 102 extends from the center of plate 96 to a steam trap, or other suitable means of disposing of condensed boiler steam, and contains a control valve 104. A conduit 106, containing a valve 108, forms an outlet for dry steam from the chest 94 to the sub-chamber 90.

The lower portion of the chamber 62 is provided with a large access opening 110 that is closed by a flanged plate 112. Extending from the sub-chamber 90 is a conduit 114 containing a valve 116, which extends to a solvent reservoir, not shown.

From an upper side of chamber 62, a vapor outlet conduit 118 extends to a T 120, and from one side of said T, a conduit 122 containing a valve 124 extends to a condenser and separator, not shown. A conduit 126 extends from a source of compressed air to the T 120 and contains a control valve 128, and a pressure gauge 130.

The operation of the invention disclosed in FIG. 2 will now be described.

As disclosed in my Patent No. 2,893,925, a slurry composed of dirt and other solids separated from a dry cleaning operation is formed in a primary filter, not shown, and transferred to the chamber 62 through the conduit 70. The container 62 is of a size sufficient to receive more than one charge of slurry, and ordinarily the successive charges are received on different days so that most of the solids will have settled to the lower part of the chamber. Therefore, the substance in the upper part of the chamber is principally liquid solvent. When it is desired to perform a recovery operation, valve 74 is closed and the free liquid in the chamber is separated by filtration. Gravity filtration may occur through the filter elements 76, but if such action is insufficient, air under pressure may be admitted to the chamber from conduit 126. When the solid residue is quite spongy and forms a suitable mat on the perforate plate 86, valve 116 may be opened to allow liquid that has flowed through the mat to pass to a suitable storage container. The arrangement of filters may differ, and an alternate disposition is shown in my prior Patent No. 2,893,925. After completion of the filtration process, distillation is commenced by admitting boiler steam through conduit 98 under control of valve 100 into the steam chest 94. Condensate is removed from the steam chest through conduit 102 under control of valve 104. Dry steam is transferred from the steam chest 94 to the sub-chamber 90 under control of valve 108, and upon entering sub-chamber 90, said dry steam passes upwardly through the apertures in the plate 86, to and through the filtered muck therein to liberate the solvent and pass outwardly through conduit 118 and valve 124 to a condenser and separator, whence the hydrocarbon solvent is recovered. As mentioned in the prior discussion of the operation of the structure of FIG. 1, when the dry steam from the sub-chamber 90 passes through the apertures in plate 86 to the solids in chamber 62, the surfaces of the chamber 62 and the material therein may be relatively cool, and therefore, a substantial amount of condensate is formed, and returns to the sub-chamber 90, where it contacts the plate 92 on the upper side of the steam chest 94. The temperature of plate 92 is in excess of 212° F., and will therefore, re-evaporate such water to steam so that there is only a minimum amount of water in the liquid phase within chamber 62. When the distillation process is completed, the flanged plate 112 is removed, and the residual solids in a dry form can be removed and disposed of, generally as waste material.

Referring now to FIG. 3, is shown a modification of the apparatus disclosed in FIGS. 1 and 2. General reference numeral 132 indicates the base portion of a container that may be used for the adsorption process disclosed in FIG. 1, or by suitable modification for the muck recovery process disclosed in FIG. 2. The structure disclosed comprises a container 134 having a dished lower portion 136, which is joined to a lower neck portion 138. Within the container, at the junction of the dished portion 136 with the body 134 is a foraminous plate 140. Extending from one side of the neck portion 138 is a conduit 142 provided with a flow control means 143. Secured to the lower extremity of the neck portion 138 is an impervious plate 144 forming a common wall between the interior of the container 134 and a heater 146. The heater 146 may be either an expansion chamber that is connected to a steam line, and provided with a connection to a steam trap, such as disclosed in FIGS. 1 and 2, or it may be a suitable form of electric heater capable of heating the plate 144. There is also joined to neck portion 138 a conduit 148 containing a control valve 150. The conduit 148 extends from either a source of steam or of water, which when it enters the container and contacts the plate 144 is transformed into steam for the distilling process.

In the operation of the apparatus disclosed in FIG. 3, when the mixture of solids and the solvent are ready for distillation, and assuming the flow control means 143 in conduit 142 is closed, the heater 146 is energized to maintain the temperature of plate 144 above the boiling point of water. Then, either water or steam is admitted through conduit 148. If the incoming fluid is either water or steam of poor quality, the heater 146 and plate 144 form steam which passes upwardly through the foraminous plate 140. Until the container 134 and its various parts, as well as the material therein are properly heated, condensate will form and return through the plate 140 to the plate 144, where it is re-evaporated. The mixture of vapors passing upwardly from the solids are condensed and separated in the conventional manner.

Although no controls have been illustrated in conjunction with valves 52, 108 and 150, it should be understood that suitable controls and gauges are employed so that the pressure in the lower part of the container is suitably controlled to provide low pressure steam.

The principal advantage of the present invention resides in the provision of a method of separating one substance from another by steam distillation within a container in such a manner as to preclude condensing within said container a large amount of water from the steam, which is introduced into the combined substances.

Another advantage is that the invention may be practiced in places where the quality of boiler steam may not be good, or where boiler steam is not available.

My invention is defined in the terms of the appended claims.

I claim:
1. A method of recovering a volatile organic solvent from an adsorbent with stripping steam, comprising the steps of supporting said adsorbent on a perforate surface within a container, heating a surface below the perforate surface and within said container to a temperature above the boiling point of water under the pressure existing within said container, and admitting stripping steam into the container and in contact with the adsorbent to strip the volatile solvent therefrom, said heated surface acting to revolatilize condensate formed by the steaming operation and acting to maintain the area within the container beneath the perforate surface in a liquid-free condition.

2. A method of recovering a volatile organic solvent from an adsorbent with stripping steam, comprising the steps of supporting said adsorbent on a perforate surface within a container, heating a surface below the perforate surface and within said container to a temperature above the boiling point of water under the pressure existing within said container, and admitting stripping steam into the container beneath said perforate surface to pass therethrough and contact the adsorbent to strip the volatile solvent therefrom, said heated surface acting to revolatilize condensate formed by the steaming operation and maintaining the area beneath said perforate surface in a liquid-free condition.

3. A method of recovering a volatile organic solvent from a solid adsorbent with steam, comprising the steps of supporting said adsorbent on a perforate surface within a container, heating a surface within said container and below the perforate surface to a temperature substantially above the boiling point of water at the pressure existing within said container, and admitting a stripping fluid into the container beneath the perforate surface and above the heated surface and which is passed through the perforate surface and to the adsorbent as steam, said heated surface acting to revolatilize condensate formed by the steaming operation and also acting to maintain the area beneath said perforate surface in a liquid-free condition.

References Cited in the file of this patent

UNITED STATES PATENTS

| | | |
|---|---|---|
| 194,256 | McKeever | Aug. 14, 1877 |
| 915,169 | Frank | Mar. 16, 1909 |
| 1,098,312 | Castona | May 26, 1914 |
| 1,112,980 | Castona | Oct. 6, 1914 |
| 1,281,597 | Lessing | Oct. 15, 1918 |
| 1,622,671 | Rather et al. | Mar. 29, 1927 |
| 2,689,213 | Records | Sept. 14, 1954 |
| 2,702,433 | Cohen | Feb. 22, 1955 |
| 2,774,727 | Hobson | Dec. 18, 1956 |
| 2,893,925 | Victor | July 7, 1959 |
| 2,901,137 | Victor | Oct. 27, 1959 |